(12) United States Patent
Benedict et al.

(10) Patent No.: US 12,085,293 B2
(45) Date of Patent: Sep. 10, 2024

(54) STAGED REGENERATED LIQUID DESICCANT DEHUMIDIFICATION SYSTEMS

(71) Applicant: Mojave Energy Systems, Inc., Palo Alto, CA (US)

(72) Inventors: Michael Benedict, Palo Alto, CA (US); Eugene S. Beh, Portola Valley, CA (US); Francisco E. Torres, San Jose, CA (US)

(73) Assignee: Mojave Energy Systems, Inc., Sunnyvale, CA (US)

( * ) Notice: Subject to any disclaimer, the term of this patent is extended or adjusted under 35 U.S.C. 154(b) by 415 days.

(21) Appl. No.: 17/204,703

(22) Filed: Mar. 17, 2021

(65) Prior Publication Data

US 2022/0299223 A1   Sep. 22, 2022

(51) Int. Cl.
*F24F 3/14* (2006.01)
*B01D 53/14* (2006.01)
(Continued)

(52) U.S. Cl.
CPC .......... *F24F 11/30* (2018.01); *B01D 53/1406* (2013.01); *B01D 53/1425* (2013.01);
(Continued)

(58) Field of Classification Search
CPC ...... F24F 3/1411; F24F 3/1417; F24F 3/1429; F24F 2003/1458
See application file for complete search history.

(56) References Cited

U.S. PATENT DOCUMENTS

| | | | |
|---|---|---|---|
| 2,147,248 | A | 2/1939 | Fleisher |
| 2,214,880 | A | 9/1940 | Crawford |

(Continued)

FOREIGN PATENT DOCUMENTS

| | | |
|---|---|---|
| CN | 105308317 A | 2/2016 |
| CN | 206055832 | 3/2017 |

(Continued)

OTHER PUBLICATIONS

U.S.Office Action for U.S. Appl. No. 16/200,309, filed Apr. 20, 2022; 23 pgs.
(Continued)

*Primary Examiner* — Jerry-Daryl Fletcher
*Assistant Examiner* — Daniel C Comings
(74) *Attorney, Agent, or Firm* — COOLEY LLP

(57) ABSTRACT

A system comprises a liquid desiccant regeneration system, a first air contactor stage, and a second air contactor stage. The regeneration system has a first stage with a first concentration output and first diluted output, and a second stage with a second concentration output, different from the first concentration output, and a second diluted output. The first air contactor stage is coupled to the first concentrated output to form a first output air stream having a reduced water content and a first diluted air contactor output. The second air contactor stage is coupled to the second concentrated output to form a second output air stream having a reduced water content and a second diluted air contactor output. Both diluted air contactor outputs are recirculated into the regeneration system, and the output air streams are combined.

22 Claims, 9 Drawing Sheets

(51) Int. Cl.
  *B01D 53/18* (2006.01)
  *B01D 53/26* (2006.01)
  *B01D 53/28* (2006.01)
  *F24F 11/00* (2018.01)
  *F24F 11/30* (2018.01)
  *F24F 110/20* (2018.01)
  *F24F 110/22* (2018.01)

(52) U.S. Cl.
  CPC ............ *B01D 53/18* (2013.01); *B01D 53/263* (2013.01); *B01D 53/28* (2013.01); *F24F 3/1417* (2013.01); *F24F 3/1429* (2013.01); *F24F 11/0008* (2013.01); *B01D 2252/10* (2013.01); *F24F 2003/1458* (2013.01); *F24F 2110/20* (2018.01); *F24F 2110/22* (2018.01)

(56) References Cited

U.S. PATENT DOCUMENTS

| | | |
|---|---|---|
| 2,276,970 A | 3/1942 | Hyde |
| 2,290,465 A | 7/1942 | Crawford |
| 2,672,024 A | 3/1954 | McGrath |
| 2,798,570 A | 7/1957 | Kelley |
| 3,277,954 A | 10/1966 | Gershon |
| 3,336,423 A | 8/1967 | Le et al. |
| 3,350,892 A | 11/1967 | Kelley |
| 3,729,142 A | 4/1973 | Rangel et al. |
| 3,819,118 A | 6/1974 | Brock et al. |
| 3,981,452 A | 9/1976 | Eckstein |
| 3,993,248 A | 11/1976 | Harmony |
| 4,118,299 A | 10/1978 | Maget |
| 4,164,125 A | 8/1979 | Griffiths |
| 4,205,529 A | 6/1980 | Ko |
| 4,259,849 A | 4/1981 | Griffiths |
| 4,287,721 A | 9/1981 | Robison |
| 4,340,479 A | 7/1982 | Pall |
| 4,340,480 A | 7/1982 | Pall et al. |
| 4,355,683 A | 10/1982 | Griffiths |
| 4,593,534 A | 6/1986 | Bloomfield |
| 4,612,019 A | 9/1986 | Langhorst |
| 4,691,530 A | 9/1987 | Meckler |
| 4,700,550 A | 10/1987 | Rhodes |
| 4,900,448 A | 2/1990 | Bonne et al. |
| 4,984,434 A | 1/1991 | Peterson et al. |
| 5,022,241 A | 6/1991 | Wilkinson |
| 5,351,497 A | 10/1994 | Lowenstein |
| 5,460,004 A | 10/1995 | Tsimerman |
| 5,528,905 A | 6/1996 | Scarlatti |
| 5,586,727 A | 12/1996 | Shekalim |
| 5,615,838 A | 4/1997 | Eckstein et al. |
| 5,634,269 A | 6/1997 | Lowenstein et al. |
| 5,797,272 A | 8/1998 | James |
| 5,928,409 A | 7/1999 | Sirkar |
| 5,966,955 A | 10/1999 | Maeda |
| 6,018,954 A | 2/2000 | Assaf |
| 6,080,507 A | 6/2000 | Yu |
| 6,149,817 A | 11/2000 | Peterson et al. |
| 6,159,352 A | 12/2000 | Riera et al. |
| 6,187,201 B1 | 2/2001 | Abe et al. |
| 6,463,750 B2 | 10/2002 | Assaf |
| 6,487,872 B1 | 12/2002 | Forkosh et al. |
| 6,497,107 B2 | 12/2002 | Maisotsenko et al. |
| 6,497,749 B2 | 12/2002 | Kesten et al. |
| 6,719,891 B2 | 4/2004 | Ruhr et al. |
| 6,745,826 B2 | 6/2004 | Lowenstein et al. |
| 6,976,365 B2 | 12/2005 | Forkosh et al. |
| 6,986,428 B2 | 1/2006 | Hester et al. |
| 7,083,730 B2 | 8/2006 | Davis |
| 7,279,215 B2 | 10/2007 | Hester et al. |
| 7,430,878 B2 | 10/2008 | Assaf |
| 7,942,011 B2 | 5/2011 | Forkosh |
| 7,942,387 B2 | 5/2011 | Forkosh |
| 7,974,076 B2 | 7/2011 | Xiong et al. |
| 7,977,395 B2 | 7/2011 | Lin et al. |
| 7,992,855 B2 | 8/2011 | Awano |
| 8,142,633 B2 | 3/2012 | Batchelder et al. |
| 8,171,746 B2 | 5/2012 | Miyauchi et al. |
| 8,545,692 B2 | 10/2013 | James et al. |
| 8,623,210 B2 | 1/2014 | Manabe et al. |
| 8,685,142 B2 | 4/2014 | Claridge et al. |
| 8,696,805 B2 | 4/2014 | Chang et al. |
| 8,769,971 B2 | 7/2014 | Kozubal et al. |
| 8,769,972 B2 | 7/2014 | Bahar |
| 8,790,454 B2 | 7/2014 | Lee et al. |
| 8,800,308 B2 | 8/2014 | Vandermeulen et al. |
| 8,801,910 B2 | 8/2014 | Bazant et al. |
| 8,999,132 B2 | 4/2015 | Bazant et al. |
| 9,000,289 B2 | 4/2015 | Vandermeulen et al. |
| 9,086,223 B2 | 7/2015 | Vandermeulen et al. |
| 9,101,874 B2 | 8/2015 | Vandermeulen |
| 9,101,875 B2 | 8/2015 | Vandermeulen et al. |
| 9,112,217 B2 | 8/2015 | Kim et al. |
| 9,140,471 B2 | 9/2015 | Kozubal et al. |
| 9,243,810 B2 | 1/2016 | Vandermeulen et al. |
| 9,273,876 B2 | 3/2016 | Smith et al. |
| 9,308,490 B2 | 4/2016 | Vandermeulen et al. |
| 9,340,436 B2 | 5/2016 | Sahu et al. |
| 9,506,697 B2 | 11/2016 | Vandermeulen |
| 9,541,302 B2 | 1/2017 | Taylor et al. |
| 9,546,426 B2 | 1/2017 | Logan et al. |
| 9,548,620 B2 | 1/2017 | Hu et al. |
| 9,631,848 B2 | 4/2017 | Vandermeulen et al. |
| 9,640,826 B2 | 5/2017 | Yan et al. |
| 9,670,077 B2 | 6/2017 | Volkel et al. |
| 9,673,472 B2 | 6/2017 | Volkel et al. |
| 9,709,285 B2 | 7/2017 | Vandermeulen |
| 9,835,340 B2 | 12/2017 | Vandermeulen et al. |
| 9,905,876 B2 | 2/2018 | Schubert et al. |
| 9,982,901 B2 | 5/2018 | Mongar |
| 10,012,401 B2 | 7/2018 | Forkosh |
| 10,024,558 B2 | 7/2018 | Vandermeulen |
| 10,124,296 B2 | 11/2018 | Pozzo et al. |
| 10,302,317 B2 | 5/2019 | Erb et al. |
| 10,443,868 B2 | 10/2019 | Vandermeulen et al. |
| 10,525,417 B2 | 1/2020 | Newbloom et al. |
| 10,550,014 B2 | 2/2020 | Desai et al. |
| 10,604,426 B2 | 3/2020 | Connor, Jr. et al. |
| 10,648,743 B2 | 5/2020 | Kozubal et al. |
| 10,655,870 B2 | 5/2020 | Lowenstein |
| 10,712,024 B2 | 7/2020 | LePoudre et al. |
| 10,721,024 B2 | 7/2020 | Seo |
| 10,821,395 B2 | 11/2020 | Beh et al. |
| 10,822,254 B2 | 11/2020 | Desai et al. |
| 10,962,252 B2 | 3/2021 | LePoudre et al. |
| 11,015,875 B2 | 5/2021 | Benedict et al. |
| 11,020,713 B2 | 6/2021 | Demeter et al. |
| 11,029,045 B2 | 6/2021 | Woods et al. |
| 11,117,090 B2 | 9/2021 | Benedict et al. |
| 11,149,970 B2 | 10/2021 | Bahar et al. |
| 11,185,823 B2 | 11/2021 | Beh et al. |
| 11,326,790 B2 | 5/2022 | Woods et al. |
| 11,532,831 B1 | 12/2022 | Beh |
| 11,760,631 B2 | 9/2023 | Chandran et al. |
| 11,944,934 B2 | 4/2024 | Benedict et al. |
| 2002/0038552 A1 | 4/2002 | Maisotsenko et al. |
| 2004/0118125 A1 | 6/2004 | Potnis et al. |
| 2004/0168462 A1 | 9/2004 | Assaf |
| 2004/0231512 A1 | 11/2004 | Slayzak et al. |
| 2005/0183956 A1 | 8/2005 | Katefidis |
| 2006/0130654 A1 | 6/2006 | King et al. |
| 2006/0141346 A1 | 6/2006 | Gordon et al. |
| 2009/0114594 A1 | 5/2009 | Sirkar |
| 2009/0178436 A1 | 7/2009 | Chiriac |
| 2010/0170776 A1 | 7/2010 | Ehrenberg et al. |
| 2010/0275629 A1 | 11/2010 | Erickson |
| 2011/0132027 A1 | 6/2011 | Gommed et al. |
| 2012/0304862 A1 | 12/2012 | Taylor et al. |
| 2013/0199220 A1 | 8/2013 | Ma et al. |
| 2013/0319021 A1 | 12/2013 | Ball et al. |
| 2013/0340449 A1 | 12/2013 | Kozubal et al. |
| 2014/0054013 A1 | 2/2014 | LePoudre et al. |
| 2014/0260367 A1 | 9/2014 | Coutu et al. |
| 2014/0262125 A1 | 9/2014 | Erb et al. |
| 2014/0326433 A1 | 11/2014 | Kozubal |

(56) References Cited

U.S. PATENT DOCUMENTS

| | | |
|---|---|---|
| 2014/0349279 A1 | 11/2014 | Berthelot et al. |
| 2015/0048777 A1 | 2/2015 | Goldstein |
| 2015/0059576 A1 | 3/2015 | Shibata |
| 2015/0101625 A1 | 4/2015 | Newton et al. |
| 2015/0232348 A1 | 8/2015 | Jepson |
| 2015/0260420 A1 | 9/2015 | Forkosh |
| 2015/0291452 A1 | 10/2015 | Jikihara et al. |
| 2015/0292754 A1 | 10/2015 | Mongar |
| 2015/0300754 A1 | 10/2015 | Vandermeulen et al. |
| 2015/0327596 A1 | 11/2015 | Alarcon et al. |
| 2016/0138817 A1 | 5/2016 | Hamlin et al. |
| 2017/0145803 A1 | 5/2017 | Yeh et al. |
| 2017/0292722 A1 | 10/2017 | Vandermeulen |
| 2018/0187906 A1 | 7/2018 | Bahar et al. |
| 2018/0191012 A1 | 7/2018 | Zhang |
| 2018/0328602 A1 | 11/2018 | Vandermeulen |
| 2019/0145639 A1 | 5/2019 | Allen et al. |
| 2019/0240614 A1 | 8/2019 | Beh et al. |
| 2019/0240623 A1 | 8/2019 | Beh et al. |
| 2019/0285290 A1 | 9/2019 | Woods et al. |
| 2019/0331353 A1 | 10/2019 | Edström et al. |
| 2020/0039314 A1 | 2/2020 | Minakuchi et al. |
| 2020/0063995 A1 | 2/2020 | LePoudre |
| 2020/0070094 A1 | 3/2020 | Hussaini et al. |
| 2020/0096212 A1 | 3/2020 | LePoudre |
| 2020/0164302 A1 | 5/2020 | Benedict et al. |
| 2020/0164312 A1 | 5/2020 | Beh et al. |
| 2020/0173671 A1 | 6/2020 | Rowe et al. |
| 2020/0182493 A1 | 6/2020 | Luttik |
| 2020/0278126 A1 | 9/2020 | Ide et al. |
| 2020/0326106 A1 | 10/2020 | Muthusubramanian |
| 2020/0333086 A1 | 10/2020 | Benedict et al. |
| 2020/0346164 A1 | 11/2020 | Verplancke |
| 2020/0384421 A1 | 12/2020 | Newbloom et al. |
| 2020/0388871 A1 | 12/2020 | Newbloom et al. |
| 2020/0393145 A1 | 12/2020 | Woods et al. |
| 2021/0254844 A1 | 8/2021 | Qasem et al. |
| 2021/0283528 A1 | 9/2021 | Pokornýet al. |
| 2021/0298246 A1 | 9/2021 | Lefers et al. |
| 2021/0354089 A1 | 11/2021 | Wu et al. |
| 2021/0370228 A1 | 12/2021 | Benedict et al. |
| 2022/0193612 A1 | 6/2022 | Torres et al. |
| 2022/0223885 A1 | 7/2022 | Beh et al. |
| 2022/0243932 A1* | 8/2022 | Benedict ............... F24F 3/1429 |
| 2022/0299223 A1 | 9/2022 | Benedict et al. |
| 2022/0410070 A1 | 12/2022 | Beh |
| 2023/0141446 A1 | 5/2023 | Beh et al. |
| 2023/0173433 A1 | 6/2023 | Benedict et al. |
| 2023/0191312 A1 | 6/2023 | Benedict et al. |
| 2023/0264140 A1 | 8/2023 | Beh et al. |
| 2023/0280049 A1 | 9/2023 | Farese et al. |
| 2023/0294038 A1 | 9/2023 | Wallace |
| 2023/0332780 A1 | 10/2023 | Meles et al. |
| 2024/0131468 A1 | 4/2024 | Morajkar |

FOREIGN PATENT DOCUMENTS

| | | |
|---|---|---|
| CN | 108187459 | 6/2018 |
| CN | 207455783 U | 6/2018 |
| CN | 111964168 A | 11/2020 |
| EP | 3336064 | 6/2018 |
| JP | 04-18919 | 4/1992 |
| KR | 20130106530 | 9/2013 |
| KR | 20150034545 | 4/2015 |
| WO | WO-9528609 A1 | 10/1995 |
| WO | WO-2011062808 A1 | 5/2011 |
| WO | WO-2012170887 A2 | 12/2012 |
| WO | 2014/181898 | 11/2014 |
| WO | 20150143332 | 9/2015 |
| WO | 2018/032003 | 2/2018 |
| WO | 2018/119280 | 6/2018 |
| WO | 20180191806 | 10/2018 |
| WO | WO-2020112592 A1 | 6/2020 |
| WO | WO-2020112712 A1 | 6/2020 |
| WO | WO-2023201184 A1 | 10/2023 |
| WO | WO-2024086450 A1 | 4/2024 |

OTHER PUBLICATIONS

Abdollahi and Shams, "Optimization of shape and angle of attack of winglet vortex generator in a rectangular channel for heat transfer enhancement," Applied Thermal Engineering, 2015;81:376-387.

Ashrae, et al., "Desiccant Dehumidification and Pressure Drying Equipment," 2012 Ashrae Handbook—HVAC Systems and Equipment, Chapter24, p. 24.1-24.12.

Biswas and Chattopadhyay, Heat Transfer in a Channel with Built-In Wing-Type Vortex Generators, Int J Heat Mass Transfer, 1992;35(4):803-814.

Biswas et al., "Numerical and experimental determination of flow structure and heat transfer effects of longitudinal vortices in a channel flow," Int J Heat Mass Transfer, 1996;39(16):3441-3451.

Chen et al., "Experimental and numerical heat transfer investigation of an impingement jet array with V-ribs on the target plate and on the impingement plate," Intl J Heat Fluid Flow, 2017;68:126-138.

Cheng et al., "Experimental investigation of an electrodialysis regenerator for liquid desiccant", Energy and Buildings, (2013); 67:419-425.

Cheng et al, "Performance analysis of a new desiccant pre-treatment electrodialysis regeneration system for liquid desiccant", 2013, Elsevier, 66, 1-15 (Year: 2013).

Conde-Petit and Weber, "Open Absorption System for Cooling and Air Conditioning using Membrane Contactors—Annual Report 2006," Publication No. 260098, Project: 101310—Open Absorption System for Cooling and Air Conditioning using Membrane Contactors, Date of publication: Nov. 14, 2006, Contractor: M. Conde Engineering, 13 pages.

Conde-Petit and Weber, "Open Absorption System for Cooling and Air Conditioning Using Membrane Contactors—Final Report," Publication No. 280139, Project: 101310—Open Absorption System for Cooling and Air conditioning using Membrane Contactors, Date of publication: Jul. 8, 2008, Contractor: M. Conde Engineering. 50 pages.

Conde-Petit, M. "Liquid Desiccant-Based Air-Conditioning Systems—LDACS," Proc. of the 1st European Conference on Polygeneration-Technologies and Applications, 217-234, A. Coronas, ed., Tarragona-Spain, Oct. 16-17, 2007 Published by Crever-Universitat, 17 pages.

Conde-Petit, M. Open Absorption Systems for Air-Conditioning using Membrane Contactors, Proceedings '15. Schweizerisches Status-Seminar Energie-und Umweltforschung im Bauwesen, Sep. 11-12, 2008—ETH Zurich, Switzerland. Published by Brenet-Eggwilstr. 16a, CH-9552 Bronschhofen-Switzerland {brenet@vogel-tech.ch), 12 pages.

Conde-Petit, Manuel, "Open Absorption System for Cooling and Air Conditioning using Membrane Contactors—Annual Report 2005," Publication No. Publication 260097, Project: 101310—Open Absorption System for Cooling and Air conditioning using Membrane Contactors, Date of publication: Jan. 31, 2006, Contractor: M. Conde Engineering, 8 pages.

Cooling tower Fill material: Gain a Deep Understanding, Linquip Technews, available online [retrieved on Mar. 1, 022]. Retrieved from the Intenet: URL: https://www.linquip.com/blog/cooling-tower-fill-materiala/; 3 pgs.

Dean and Lowenstein, "A Solar Liquid-Desiccant Air Conditioner for Low-electricity Humidity Control-Summary Report," Energy and Water Projects Demonstration Plan SI-0822; TP-7 M0-56437-2, Nov. 2012; 41 pgs.

Ebrahimi et al., "Numerical study of liquid flow and heat transfer in rectangular microchannel with longitudinal vortex generators," Applied Thermal Eng, 2015;78:576-583.

European Search Report for EP22151282.5 issued by the European Patent Office, dated Jun. 3, 2022; 10 pgs.

Extended European Search Report for EP 22150661.1 issued by the European Patent Office dated Jun. 9, 2022; 14 pgs.

(56) References Cited

OTHER PUBLICATIONS

Friedman et al. "Mapping Microscale Chemical Heterogeneity in Nation Membranes with X-ray Photoelectron Spectroscopy," Journal of the Electrochemical Society, (2018); 165(11):733-741.

Gao et al., "A review on integration and design of desiccant air-conditioning systems for overall performance improvements," Renewable and Sustainable Energy Reviews, Feb. 23, 2021;141:110809: 25 pgs.

Gentry and Jacobi, "Heat Transfer Enhancement on a Flat Plate using Delta-Wing Vortex Generators," ACRC Project 40, Jul. 1995:109 pgs.

Guler et al. "Performance-determining membrane properties in reverse electrodialysis", Journal of Membrane Science, (2013); 446:266-276.

International Preliminary Report of Patentability for International Application No. PCT/US2019/062924, dated May 25, 2021, 9 pages.

International Search Report and Written Opinion for International Application No. PCT/US2019/062924, dated Mar. 9, 2020, 12 pages.

International Search Report and Written Opinion for International Application No. PCT/US2019/063157, dated Mar. 9, 2020, 11 pages.

Invitation to Pay Additional Fees for International Application PCT/US2022/82272, dated Apr. 7, 2023, 02 pages.

Li et al., "Numerical simulation on flow and heat transfer of fin-and-tube heat exchanger with longitudinal vortex generators," IntlJThermalSci; 2015;92:85-96.

Li, F., et al., "Novel spacers for mass transfer enhancement in membrane separations," Journal of Membrane Science, May 2005; 253{1-2}: 1-12.

Ling, Y., et al., "CFD simulation of fluid flow through spacer-filled membrane module: selecting suitable cell types for periodic boundary conditions," Desalination, 2008; 233(1):351-358.

Lu et al., "Numerical simulation on performances of plane and curved winglet-Pair vortex generators in a rectangular channel and field synergy analysis," Intl J Thermal Sci, 2016;109:323-333.

Patankar and Prakash, "An Analysis of the Effect of Plate Thickness on Laminar Flow and Heat Transfer in Interrupted-Plate Passages," Intl J Heat Mass Transfer, 1981;24(11):1801-1810.

Shamshery et al., "Modeling the future of irrigation: A parametric description of pressure compensating drip irrigation miller performance," PLoS One, 2017; 12{4}: e0175241: 24 pgs.

Song et al., "Interaction of counter rotating longitudinal vortices and the effect on fluid flow and heat transfer," Intl J Heat Mass Transfer, 2016;93:349-360.

Tiggelbeck et al., "Experimental investigations of heat transfer enhancement and flow losses in a channel with double rows of longitudinal vortex generators," Intl J Heat Mass Transfer, 1993;36(9):2327-2337.

Two Stage Regenerator, AIL Research, Inc., available online [retrieved on Mar. 1, 2022]. Retrieved from the Internet: URL: http://ailr.com/our-technology/two-stage-regenerator/; 1 pg.

Vitillo et al., "Flow analysis of an innovative compact heat exchanger channel geometry," Intl J Heat Fluid Flow, 2016;58:30-39.

Wu and Tao, "Effect of longitudinal vortex generator on heat transfer in rectangular channels," AppliedThermalEngineering;2012;37:67-72.

Wu and Tao, "Numerical Study on laminar convection heat transfer in a channel with longitudinal vortex generator. Part B: Parametric study of major influence factors," Intl J Heat Mass Transfer, 2008;51:3683-3692.

Zhang et al., "Performance optimization of heat pump driven liquid desiccant dehumidification systems," Energy and Buildings, Jun. 9, 2012;52:132-144.

Zhang et al., "The mechanism of heat transfer enhancement using longitudinal vortex generators in a laminar channel flow with uniform wall temperature," Intl J Thermal Sci, 2017;117:26-43.

Wang et al., "Continuous desalination with a metal-free redox-mediator", Journal of Materials Chemistry A, No. 7, 2019, 7 pages.

Petrova et al., "Perfluorinated hybrid membranes modified by metal decorated clay nanotubes", Journal of Membrane Science, vol. 582, Jul. 15, 2019, pp. 172-181.

Pismenskaya et al., "Can the electrochemical performance of heterogeneous ion-exchange membranes be better than that of homogeneous membranes?", Journal of Membrane Science, vol. 566, Nov. 15, 2018, pp. 54-68.

Shah et al., "Comparative Studies on Performance of Interpolymer and Heterogeneous Ion-Exchange Membranes for Water Desalination by Electrodialysis", Desalination 172, 2005, pp. 257-265.

Epsztein et al., "Activation behavior for ion permeation in ion-exchange membranes: Role of ion dehydration in selective transport", Journal of Membrane Science 580, 2019, pp. 316-326.

Kaibara et al., Study of Ion Transport across Amphoteric Ion Exchange Membrane. II. Transport of Symmetric Tetraalkylammonium Chlorides?,, Bull. Chem. Sco. Jpn, 56, 1983, pp. 1346-1350.

European Patent Application No. 22157879.4, Extended EP Search Report dated Aug. 26, 2022, 10 pages.

"Lazard's Levelized Cost of Storage—Version 2.0." 2016, 46 pages.

Al-Jubainawi et al., "Factors governing mass transfer during membrane electrodialysis regeneration of LiCl solution for liquid desiccant dehumidification systems", Sustainable Cities and Society, vol. 28, Aug. 26, 2016.

Al-Karaghouli et al., "Energy consumption and water production cost of conventional and renewable-energy-powered desalination processes", Renewable and Sustainable Energy Reviews 2013, 24, 343-356.

Anderson et al., Capacitive deionization as an electrochemical means of saving energy and delivering clean water. Comparison to present desalination practices: Will it compete?:, Electrochimica Acta 2010, 55 (12), 3845-3856.

Arellano et al., "Effects of pH on the degradation of aqueous ferricyanide by photolysis and photocatalysis under solar radiation", Solar Energy Materials and Solar Cells 2010, 94 (2), 327-332.

Ashrae Standard, "Method of Testing for Rating Desiccant Dehumidifiers Utilizing Heat for the Regeneration Process", 2007.

Bajpayee et al., "Very low temperature membrane-free desalination by directional solvent extraction", Energy Environ. Sci. 2011, 4 (5), 1672.

Beh et al., "A Neutral pH Aqueous Organic-Organometallic Redox Flow Battery with Extremely High Capacity Retention" ACS Energy Lett, 2017, 2, pp. 639-644.

Beh et al., U.S. Appl. No. 16/200,309, filed Nov. 26, 2018.
Beh et al., U.S. Appl. No. 16/378,769, filed Apr. 9, 2019.
Benedict et al., U.S. Appl. No. 16/200,376, filed Nov. 26, 2018.
Benedict et al., U.S. Appl. No. 16/386,389, filed Apr. 17, 2019.
Benedict et al., U.S. Appl. No. 17/161,904, filed Jan. 29, 2021.

Btmap-Vi et al., "Ordering and Customer Service Neutral pH Aqueous Redox Flow Battery Materials", Jan. 1, 2017, pp. 639.

Cheng et al., "Double-Stage Photovoltaic/Thermal ED Regeneration for Liquid Desiccant Cooling System", Energy and Buildings, 51, 2012, pp. 64-72.

Dai, "Increasing drought under global warming in observations and models", Nat. Clim.Change 2013, 3 (1), 52-58.

Darling et al., "Pathways to low-cost electrochemical energy storage: a comparison of aqueous and nonaqueous flow batteries", Energy Environ. Sci. 2014, 7 (11), 3459-3477.

Desai et al., "Electrochemical Desalination of Seawater and Hypersaline Brines with Coupled Electricity Storage", ACS Energy Lett. 3, 2, 2018, pp. 375-379.

Desalination Experts Group, "Desalination in the GCC", 2014, 47 pages.

Dipaola, "Saudi Arabia Gets Cheapest Bids for Solar Power in Auction"Bloomberg, Jan. 16, 2018, 3 pages.

Ferguson et al., "Studies On Overvoltage. IX: The Nature of Cathode and Anode Discharge Potentials at Several Metal Surfaces1,2", J. Phys. Chem. 1937, 42 (2), 171-190. (no copy available).

Gong et al., "A zinc-iron redox-flow battery under $100 per kWh of system capital cost", Energy & Environmental Science, 2015. 5 pages.

(56) References Cited

OTHER PUBLICATIONS

Gong et al., All-Soluble All-Iron Aqueous Redox-Flow Battery, ACS Energy Letters, 2016, 1, pp. 89-93.
Gowin, "Examining the economics of seawater desalination using the DEEP code", Nuclear Power Technology Development Section, I. A. E. A., Ed. Vienna, Austria, 2000.
Gu et al., "A multiple ion-exchange membrane design for redox flow batteries", Energy Environ. Sci. 2014, 7 (9), 2986.
Hilbert et al., "Correlations between the Kinetics of Electrolytic Dissolution and Deposition of Iron: I . The Anodic Dissolution of Iron", Journal of The Electrochemical Society 1971, 118 (12), 1919-1926.
Howell et al., "Overview of the DOE VTO Advanced Battery R&D Program", Jun. 6, 2016 24 pages.
Hu et al., "Long-Cycling Aqueous Organic Redox Flow Battery (AORFB) toward Sustainable and Safe Energy Storage", Journal of the American Chemical Society 2017, 139 (3), 1207-1214.
John et al., "Seasonal cycles of temperature, salinity and water masses of the western Arabian gulf", Oceanol. Acta 1990, 13 (3), 273-281.
Khawaji et al., "Advances in seawater desalination technologies", Desalination 2008, 221 (1-3), 47-69.
Konopka et al., "Diffusion coefficients of ferri- and ferrocyanide ions in aqueous media, using twin-electrode thin-layer electrochemistry", Anal. Chem. 1970, 42 (14), 1741-1746. (no copy available).
Kozubal et al., "Low-Flow Liquid Desiccant Air-Conditioning: Demonstrated Performance and Cost Implications" NREL Technical Report, Sep. 2014, 104 pages.
La Mantia et al., "Batteries for efficient energy extraction from a water salinity difference", Nano Lett. 2011, 11 (4), 1810-3.
Lee et al., "Rocking chair desalination battery based on Prussian blue electrodes", ACS Omega 2017, 2 (4), 1653-1659.
Lee et al., "Desalination of a thermal power plant wastewater by membrane capacitive deionization", Desalination 196, 2006, pp. 125-134.
Li et al., "Photovoltaic-electrodialysis regeneration method for liquid desiccant cooling system", Solar Energy, vol. 83, 2009, pp. 2195-2204.
Logan et al, "Membrane-based processes for sustainable power generation using water", Nature 2012, 488, 313.
Loutatidou, et al., "Capital cost estimation of RO plants: GCC countries versus southern Europe", Desalination 2014, 347, 103-111.
Malhotra et al., "Use cases for stationary battery technologies: A review of the literature and existing projects", Renewable and Sustainable Energy Reviews 56, 2016, pp. 705-721.
McGovern et al., "On the cost of electrodialysis for the desalination of high salinity feeds", Applied Energy 136, Dec. 2014, pp. 649-661.
Moore et al., "Evaporation from Brine Solutions Under Controlled Laboratory Conditions; Report 77 for the Texas Water Development Board", May 1968, 77 pages.
Nair et al., "Water desalination and challenges: The Middle East perspective: a review", Desalin. Water Treat. 2013, 51 (10-12), 2030-2040.
Oren, "Capacitive deionization (CDI) for desalination and water treatment—past, present and future (a review)", Desalination 2008, 228 (1-3), 10-29.
Pasta et al., "A desalination battery" Nano Lett.2012, 12 (2), 839-43.
Patil et al., "Diffusivity of some zinc and cobalt salts in water", J. Chem. Eng. Data 1993, 38 (4), 574-576.
Sadrzadeh et al., "Sea water desalination using electrodialysis", Desalination 2008, 221 (1), 440-447.
Sata, "Application of Ion Exchange Membranes. In Ion Exchange Membranes: Preparation, Characterization, Modification and Application", The Royal Society of Chemistry: Cambridge, 2004.
Schaetzle et al., "Salinity Gradient Energy: Current State and New Trends", Engineering, vol. 1, Issue 2, Jun. 2016, pp. 164-166.
Scialdone et al., "Investigation of electrode material—redox couple systems for reverse electrodialysis processes—Part II: Experiments in a stack with 10-50 ce", Journal of Electroanalystical Chemistry, vol. 704, Jun. 14, 2013, pp. 1-9.
Scialdone et al., "Investigation of electrode material—Redox couple systems for reverse electrodialysis processes. Part I: Iron redox couples", Journal of Electroanalytical Chemistry 2012, 681 (Supplement C), 66-75.
Seto et al., "Seawater desalination by electrodialysis", Desalination 1978, 25 (1), 1-7.
Solveichik, "Flow batteries: current status and trends", Chem. Rev. 2015, 115 (20), 11533-58. (no copy available).
Stillwell et al., "Predicting the specific energy consumption of reverse osmosis desalination", Water 2016, 8 (12).
Urban, "Emerging Scientific and Engineering Opportunities within the Water-Energy Nexus", Joule, Dec. 20, 2017, pp. 665-688.
US Dept. of Energy, "Desiccant Enhanced Evaporative Air-Conditioning (DEVap): Evaluation of a New Concept in Ultra Efficient Air Conditioning", Technical Report NREL/TP-5500-49722, 2011.
US Dept. of Energy, "Energy Savings Potential and RD&D Opportunities for Commercial Building HVAC Systems", Dec. 2017, 172 pages.
US Dept. of Interior/US Geological Survey, Estimated Use of Water in the United States in 2010, 2014, 64 pages.
Vermaas et al., "High Efficiency in Energy Generation from Salinity Gradients with Reverse Electrodialysis", ACS Sustainable Chem. Eng. 1, 2013, pp. 1295-1302.
Viswanathan et al., "Cost and performance model for redox flow batteries", Journal of Power Sources, vol. 247, Dec. 23, 2012, pp. 1040-1051.
Woods, "Membrane processes for heating, ventilation, and air conditioning", Renewable and Sustainable Energy Reviews, vol. 33, 2014, pp. 290-304.
Wu et al., "Kinetic study on regeneration of Fe(II)EDTA in the wet process of NO removal", Chemical Engineering Journal 2008, 140 (1), 130-135.
Ye et al., "Performance of a mixing entropy battery alternately flushed with wastewater effluent and seawater for recovery of salinity gradient energy", Energy Environ. Sci. 2014, 7 (7), 2295-2300.
Zhang et al., "A Natural Driven Membrane Process for Brackish and Wastewater Treatment: Photovoltaic Powered ED and FO Hybrid System", Environmental Science and Technology, Sep. 4, 2013, pp. 10548-10555.
Google Search for "liquid desiccant air conditioning electrodialysis" dated Mar. 9, 2021, 2 pages.
Guo, Y., et al., "Using electrodialysis for regeneration of aqueous lithium chloride solution in liquid desiccant air conditioning systems," Energy and Buildings, 2016, 116, pp. 285-295.
Mathsisfun "Polygons" 7 pages, 2020, https://www.mathsisfun.com/geometry/polygons.html#:~:text=Polygons%20are%202-dimensional%20shapes.%20They%20are%20made%20of,Greek.%20Poly-%20means%20%22many%22%20and%20-gon%20means%20%22angle%22, 7 pages (Year: 2020).
Kalpana et al., "Developments in liquid dessicant dehumidifcation system integrated with evaporative cooling technology," International Journal of Energy Research, vol. 46, No. 1, Apr. 2, 2021, pp. 61-88.

* cited by examiner

STAGED REGENERATED LIQUID DESICCANT DEHUMIDIFICATION SYSTEMS

TECHNICAL FIELD

This disclosure relates generally to air dehumidifying and conditioning systems that utilize regeneration of a liquid desiccant at a plurality of liquid desiccant concentrations.

BACKGROUND

While necessary for comfort, and in parts of the world survival, air conditioning and dehumidification have a significant negative impact on the environment. Currently, air conditioning systems produce heat that measurably increases urban temperatures, and they have the potential to discharge unsafe chemicals, such as greenhouse gases, to the atmosphere. To do this, they also consume vast amounts of energy, primarily electricity. With the climate's ever-increasing temperatures, the demand for air conditioning systems will continue to increase such that energy demand from dehumidification and air conditioning systems is expected to triple in the next thirty years.

Using liquid desiccant regenerators in an air conditioning system can reduce energy consumption as compared with vapor compression-based air conditioning systems. Liquid desiccant-based systems "fully" regenerate the liquid desiccant—they regenerate to the strongest concentration an air contactor requires to provide the desired delivery conditions of the resulting, treated air stream. However, dehumidification also takes place when liquid desiccant concentrations are below the designed threshold concentration. Described herein are dehumidification and air conditioning systems and processes that reduce both energy consumption and overall system costs by utilizing staged regeneration of liquid desiccants at a plurality of liquid desiccant concentrations.

SUMMARY

The present disclosure is directed to a system comprising a liquid desiccant regeneration system, a first air contactor stage, and a second air contactor stage. The liquid desiccant regeneration system comprises a first stage with a first concentrated output stream having a first concentration of liquid desiccant and a first diluted output stream. The regeneration system also comprises a second stage with a second concentrated output stream having a second concentration of liquid desiccant, different than the first concentration, and a second diluted output stream. The system includes a first air contactor stage coupled to the first concentrated output stream, which disposes a first input air stream having a first water content, by percent mass, in fluid communication with the first concentrated output stream to form a first output air stream having a second water content, by percent mass, lower than the first water content and a first diluted air contactor output stream. The first diluted air contactor output stream is circulated back into the liquid desiccant regeneration system. The system further includes a second air contactor stage coupled to the second concentrated output stream, which disposes a second input air stream having a third water content, by percent mass, in fluid communication with the second concentrated output stream to form a second output air stream having a fourth water content, by percent mass, lower than the third water content and a second diluted air contactor output stream. The second diluted air contactor output stream is circulated back into the liquid desiccant regeneration system, and the first and second output air streams are combined.

In another embodiment, a system comprises an air contactor. The air contactor comprises a first input stream of liquid desiccant having a first concentration of desiccant and a second input stream of liquid desiccant having a second concentration of desiccant where the second concentration is higher than the first concentration. The air contactor further comprises an input air stream disposed in fluid communication with the first input stream of liquid desiccant and with the second input stream of liquid desiccant to produce a diluted output stream of liquid desiccant and an output air stream having a water content, by mass, lower than that of the input air stream.

A further embodiment is directed to a system comprising a first liquid desiccant regeneration system, a second liquid desiccant regeneration system, a first air contactor stage, and a second air contactor stage. The first liquid desiccant regeneration system is configured to produce a first concentrated output stream having a first concentration of liquid desiccant. The second liquid desiccant regeneration system is coupled to the first concentrated output stream and configured to produce a second concentrated output stream having a second concentration of liquid desiccant different than the first concentration. The first air contactor stage is coupled to the first concentrated output stream, which disposes a first input air stream having a first water content, by mass, in fluid communication with the first concentrated output stream to form a first output air stream having a second water content, by mass, lower than the first water content and a first diluted output stream. The first diluted output stream is circulated back into the first liquid desiccant regeneration system. The second air contactor stage is coupled to the second concentrated output stream, which disposes a second input air stream having a third water content, by mass, in fluid communication with the second concentrated output stream to form a second output air stream having a fourth water content, by mass, lower than the third water content and a second diluted output stream. The second diluted output stream is circulated back into the second liquid desiccant regeneration system, and the first and second output air streams are combined.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

Figure 1:
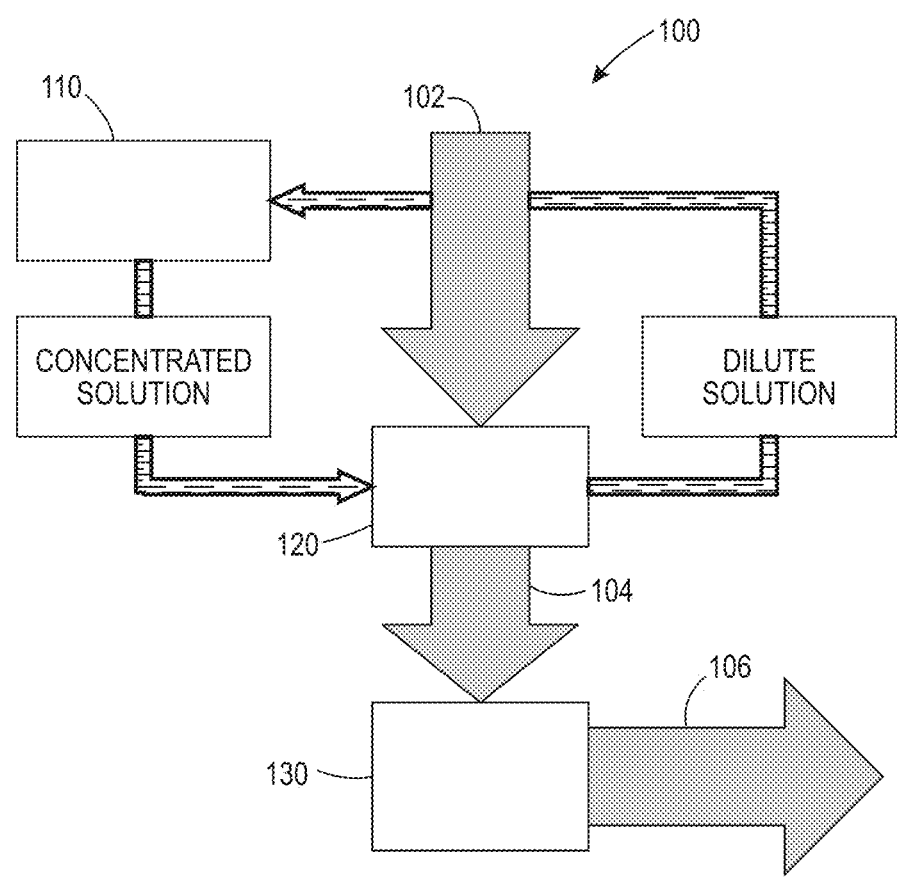
FIG. 1 is a block diagram of a regenerated liquid desiccant dehumidification system.

The present disclosure relates to regenerated liquid desiccant dehumidification systems, and in certain embodiments, electrochemically regenerated systems. A liquid desiccant system may be used in, among other things, heating, ventilation, and air-conditioning (HVAC). As set forth above, air conditioning is an energy intensive process and is responsible for nearly 10% of U.S. electricity consumption, with dehumidification accounting for more than half of the energy load in humid regions. The systems described herein provide an efficient, thermodynamic approach to dehumidification for air conditioning utilizing staged regeneration of the liquid desiccant.

The systems each utilize two, or more, liquid desiccant streams having different salt concentrations supplied to one or more air contactors to produce a stream of dehumidified air. Instead of regenerating liquid desiccant to a single, higher, concentrated output stream that would provide the desired delivery conditions of the resulting, treated air stream, multiple streams (e.g., at least two) are supplied at lower and/or increasing concentrations up to that single stream concentration. For treated air going from a hot and humid condition to a cool and dry condition, the difference in water concentrations (i.e., relative humidity of the before and after air streams) may be as much as 100%. For example, to obtain a 90° F. and 90% relative humidity output air condition may only require a desiccant concentration of 15% of lithium chloride (LiCl) desiccant dissolved in water, but to obtain a delivery condition of 70° F. and 60% relative humidity may require a desiccant concentration of 30% LiCl or more. However, a significant amount of dehumidification can take place with a concentration of desiccant well below 30%.

Using staged regeneration provides for reduced energy usage, reduced costs, and reduced system complications. Since regeneration energy is nonlinearly proportional to liquid desiccant concentration, if a portion of the liquid desiccant solution is not fully concentrated, the amount of energy used for regeneration is reduced. For electrochemical liquid desiccant regenerators, as described herein, concentrating to high concentrations (e.g., greater than 30%) increases operating costs. By staging concentration of the liquid desiccant at lower concentrations, operating costs (e.g., energy) as well as capital costs in terms of the size of the overall system and individual components (e.g., membranes) is reduced. For example, the desiccant concentration level is proportional to the size of an electrochemical regenerator membrane; however, electrochemical membranes are significantly more expensive than air contactor materials. Lower concentrations may use smaller, or fewer, membranes, or different types of membranes that tailored for the lower concentration. Further, to maintain desiccant capability in the air contactor, latent heat must be rejected. Using a staged air contactor provides multiple opportunities for external cooling of the liquid desiccant, which avoids inefficiencies associated with single point external cooling and complications associated with internal cooling in an air contactor.

The staged regeneration of liquid desiccants described herein is applicable to a variety of liquid desiccant dehumidifying systems including thermally regenerated, electrochemically regenerated systems, and combinations thereof. For example, thermal regeneration systems involve one or more of a variety of evaporative processes, including regeneration by heating, by reduced pressure (e.g. membrane pervaporation), by azeotropic removal, etc. However, exemplary embodiments herein are described with respect to an electrochemical regeneration system that utilizes a redox-assisted electrodialysis process that enables a membrane-based liquid desiccant air conditioning system. In this redox-assisted electrodialysis (ED) process, an aqueous solution of a redox-active species is circulated between the anode and cathode of an electrochemical stack to concentrate ionic solutions, eliminating thermodynamic phase changes driven by the heat or pressure necessary for vapor compression (VC) or desiccant based air conditioning. Liquid desiccants (e.g., aqueous solutions of salts such as lithium chloride) will absorb moisture from air across a membrane interface. Diluted liquid desiccants will be efficiently re-concentrated, avoiding the latent heat input required to evaporate water. It is estimated that the enhanced efficiency of this cycle leads to 1.5 quads of energy savings yearly by 2030.

In FIG. 1, a diagram illustrates a dehumidification system 100 utilizing a liquid desiccant regeneration system 110, here an electrochemical liquid desiccant regeneration system, in conjunction with an air contactor 120. The regeneration system outputs a single concentrated solution of liquid desiccant (e.g., an aqueous salt solution) to the air contactor 120. As used throughout this disclosure, an air contactor refers to a liquid to air mass and energy exchanger, which includes a membrane energy exchanger, and in certain embodiments is a dehumidifying air contactor. Air is flowed over the concentrated solution (e.g., having a concentration of up to 40%) of liquid desiccant either directly or via a membrane where water from the air stream is absorbed by the liquid desiccant stream. The air stream may be outside air, return air, or exhaust air from an enclosed space (e.g., building) that the system 100 is used to supply, or a combination of two or more of outside, exhaust, and return air. After absorbing the water from the air, the liquid desiccant stream is diluted and a single stream is output from the air contactor 120. The diluted liquid desiccant stream is then cycled back to the regeneration system 110 for regeneration (i.e., increased concentration of liquid desiccant).

In addition, a dehumidified air stream 104 (i.e., having a lower water content by percent mass than air stream 102) is output from the air contactor 120. A heat transfer system 130 can optionally be used to remove sensible heat from the air to supply a conditioned air stream 106 to the enclosed space (i.e., building). In other embodiments, sensible heat is removed earlier, or at other points, in the system for improved thermodynamic efficiencies. Sensible heat refers to the amount of energy needed to increase, or in this case decrease, the temperature of the air stream 104 independent of phase changes. The heat transfer system 130 may include any type of known heat exchange system such as vapor compression, indirect evaporative cooling, chilled water or glycol, and/or heat pipes. Also, latent heat needs to be rejected from the system: from the liquid desiccant before or after the air contactor and/or from the input or output air streams. Latent heat can be as much as 80% of the total load for outdoor air, where 1 Ton is equivalent to 3.5 kW and 5 kg water per hour.

In systems with a single solution stream between the regeneration system and an air contactor, the concentrated liquid desiccant solution enters the air contactor at the highest needed concentration and leaves at some lower concentration of liquid desiccant. In these systems, a high flow rate of solution has a low liquid desiccant concentration change across the air contactor (e.g., a change of about 2%) and requires more energy to concentrate the solution. However, there may be less need for integration with heat rejection as latent heat can be removed externally such as from the input or output liquid desiccant stream for the air contactor. Alternatively, low flow rates of the solution provide an increased, or maximum, concentration change across the air contactor (e.g., a change of about 15%) and use less energy to concentrate the solution. However, additional temperature control for the air contactor may be needed such as with added flow paths of cooling fluid with high flow rates for internal cooling within the air contactor. These operating conditions can be varied as design choices and are better understood with a more detailed description of an electrochemical regeneration system.

Figure 2:
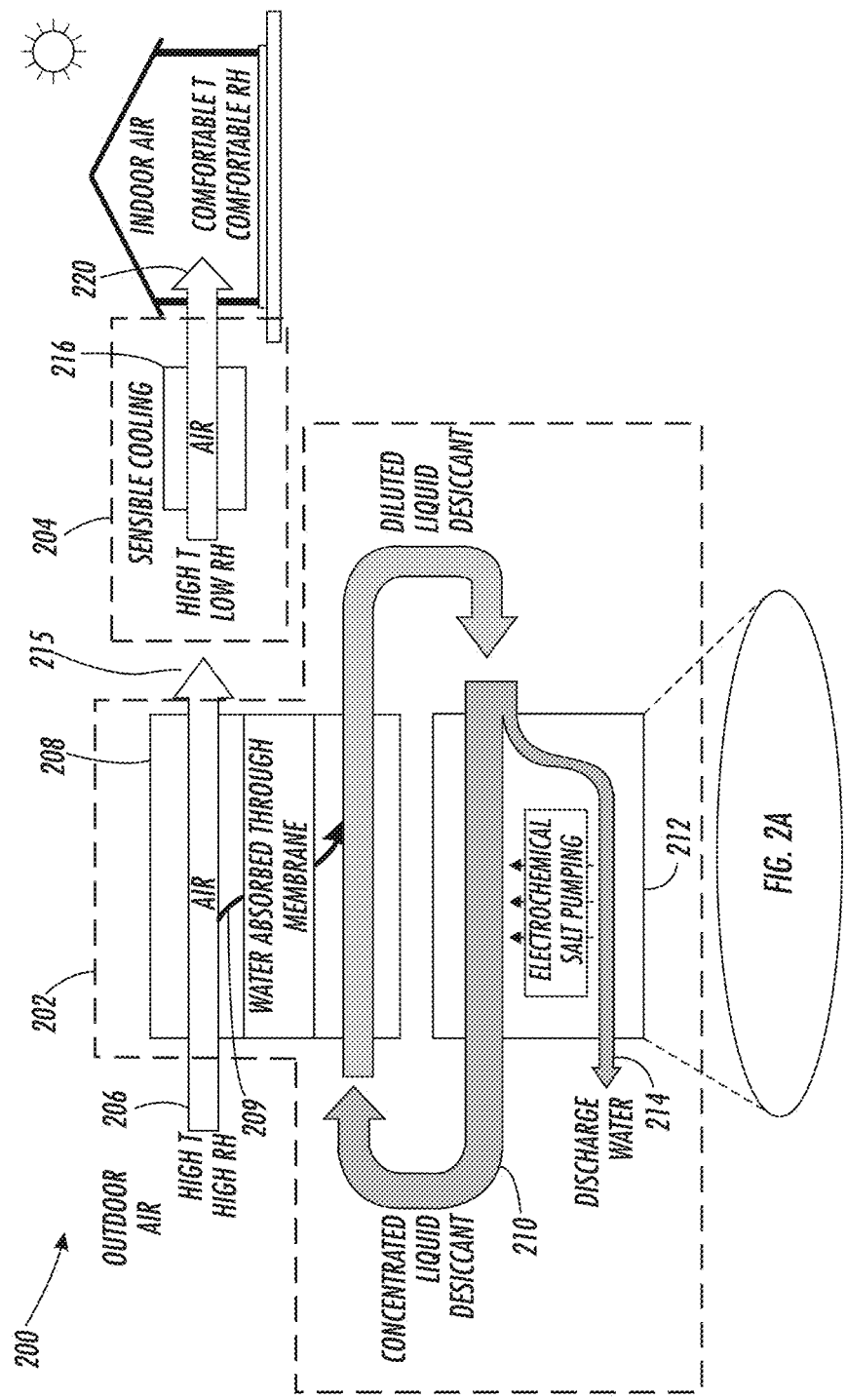
FIG. 2 is a diagram of an electrochemically regenerated liquid desiccant dehumidification system according to an example embodiment.

FIG. 2 illustrates a diagram of an electrodialytic liquid desiccant air conditioning (ELDAC) system 200 as described above in accordance with certain embodiments. The system 200 includes a desiccant section 202 and a cooling section 204. In the desiccant section 202, outdoor air 206 (and/or recirculated air) is forced across an air contactor 208 such as an air-liquid interface or liquid-carrying membrane dryer. In certain embodiments, the air 206 may be outside air of high temperature and high relative humidity (RH). Water 209 from the air 206 is absorbed at the air contactor 208 into a concentrated liquid desiccant 210, e.g., an aqueous salt solution, is then passed through a redox-assisted electrochemical regenerator 212 to separate dilute stream 214 (e.g., discharge water) and re-concentrate the desiccant stream 210. Example salts that may be used for the desiccant include, for example, LiCl, NaCl, LiBr, and $CaCl_2$).

The humidity (i.e., water content by percent mass of the humid air) is reduced in the air 215 leaving the desiccant section 202, wherein it is cooled by the cooling section 204. This cooling section 204 may include an evaporator 216 and other components not shown (e.g., condenser, compressor). Because the air 215 entering the cooling section 204 has lower relative humidity compared to the outside/recirculated air 206, the evaporator 216 is more efficient and can reduce the temperature of the cooled air 220 by a greater amount than if the evaporator 216 had to also condense moisture from the incoming air 215. Experimental results measuring the energy used by redox-assisted electrodialysis to concentrate ionic aqueous solutions show that ELDAC system 100 can have a regeneration specific heat input (RSHI) less than 0.05 kBTU/lb, which is up to 30 times lower than currently used thermal regeneration methods.

Figure 2A:
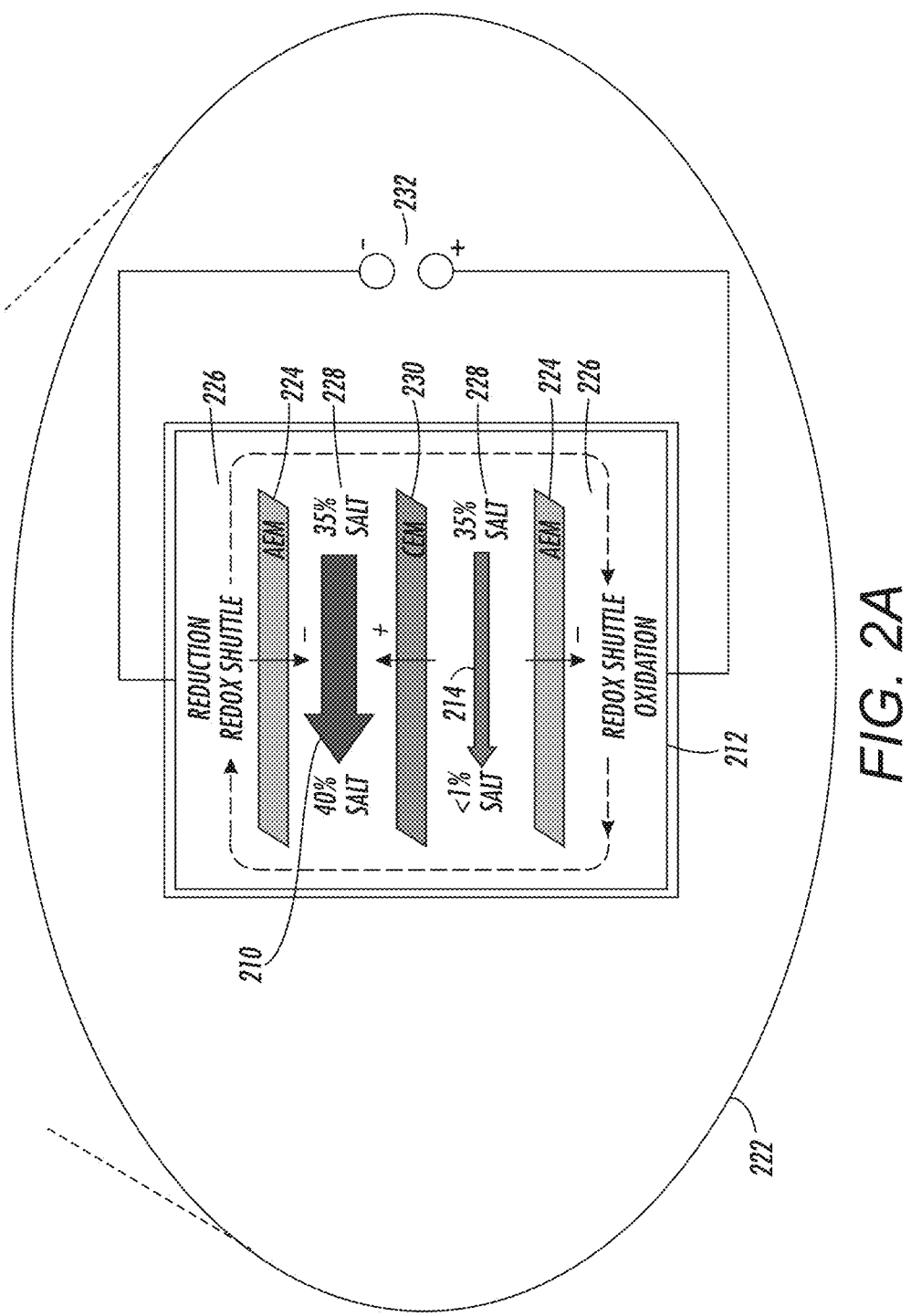
FIG. 2A is a diagram of an electrochemical liquid desiccant regeneration system according to an example embodiment.

As seen in the detail view 222 of FIG. 2A, redox-assisted regenerator 212 has two outer ion exchange membranes 224 that separate the outer redox channels 226 from the inner concentrate 210 and dilute 214 streams. In this example the outer ion exchange membranes 224 are configured as anion exchange membranes (AEM). The concentrate 210 and dilute 214 streams are separated by a central ion exchange membrane 230, which in this example is a cation exchange membrane (CEM). In other configurations, the central ion exchange membrane 230 may be an AEM and the outer membranes 224 may be CEMs. An efficient membrane pair of one CEM and one AEM in the redox-assisted regenerator 212 has a Coulombic efficiency above 70%.

The four (or more) chambered desalination cell may use either one redox-active species that is circulated around the anode and cathode, where it undergoes faradaic reactions at both electrodes, or two redox-active species that are each confined to the anode or cathode respectively. An external voltage 232 induces oxidation or reduction in redox-active shuttle molecules, driving ion movement across the membranes 224, 230 without splitting water or producing other gaseous byproducts (e.g. chlorine) and creating at least two streams: re-concentrated desiccant 210 and discharge water 214. The percentages of salt concentrations shown in FIG. 2A are examples only—both inlets do not need to have the same concentration and the output concentrations may have a range of differences in concentrations. This goal can be achieved over multiple stages. One proposed redox shuttle is a positively charged ferrocene derivative such as (1,1'-bis (3-(trimethylammonio)propyl) ferrocene/1,1'-bis(3-(trimethylammonio)propyl) ferrocenium, $[BTMAP\text{-}Fc]^{2+}/[BTMAP\text{-}Fc]^+$) 234, which is non-toxic, highly stable, has very rapid electrochemical kinetics and negligible membrane permeability. Other redox shuttle solutions may include ferrocyanide/ferricyanide ($[Fe(CN)_6]^{4-}/[Fe(CN)_6]^{3-}$) or a negatively charged ferrocene derivative. The moving parts of the system may include low pressure pumps for liquid circulation and fans for air circulation. Additional details of this type of four-channel, electrodialytic, stack with redox shuttle assist can be found in commonly-owned U.S. Pat. No. 10,821,395, which is hereby incorporated by reference in its entirety.

As discussed above, latent heat must be rejected from the dehumidification system. Using external rejection, the liquid desiccant may be circulated with a higher flow rate and a less complicated and smaller air contactor design may be utilized since the heat removal system is external to the air contactor. However, there is a smaller gradient in the liquid desiccant concentration change due to lower osmotic losses. Alternatively, internal latent heat rejection may be used for systems circulating the liquid desiccant at a lower flow rate. The lower average concentration leads to fewer losses (e.g., due to electroosmotic drag, resistance, Coulombic efficiency), but the lower flow rate can also lead to less regeneration.

In certain circumstances, an air contactor would utilize a low liquid desiccant flow rate with a modest temperature increase (e.g., five degrees) from input to output and a concentration decrease of about 15%. The air contactor would also include cooling fluid (e.g., water) with a temperature increase of about five degrees and a counter flow (counter to the flow of cooling fluid and liquid desiccant) of air having a decrease in temperature of about 10° C. and a decrease in relative humidity (e.g., from 80% to 50%). However, to achieve these delivery conditions (e.g., temperature and relative humidity decreases), the air contactor would produce about a 15% concentration gradient (e.g., concentration changing from input 30% to diluted output of 15%), which would require the liquid desiccant regenerator to reconcentrate the liquid desiccant back up to a 30% salt concentration. This is challenging for the regenerator membranes and difficult due to osmotic drag, and in certain circumstances, impossible due to electroosmotic drag. When regeneration takes place at the highest concentration for desired delivery conditions, the flow rate must also be higher since less water is absorbed.

Instead of regenerating the liquid desiccant to the highest concentration necessary for a system's most stringent delivery conditions, staged regeneration and dehumidification utilizes lower concentrations of smaller volumes of solution in incremental stages to ramp up to the final concentration. Embodiments described herein utilize an electrochemical regenerator, as described above in connection with FIGS. 2 and 2A unless otherwise described, to produce two or more concentrated liquid desiccant output solutions in connection with two, or more, air contactor stages. However, the embodiments may be used with other liquid desiccant regeneration systems such as thermal regeneration and reverse osmosis systems. Unlike the systems described above, which utilize a single regenerator concentrated output stream, regeneration and dehumidification occur in stages using two or more streams of liquid desiccant having a smaller concentration than that of a system using a single regenerator concentrated output stream. Various systems utilizing staged liquid desiccant regeneration in combination with two or more air contactor stages are further described below.

Figure 3:
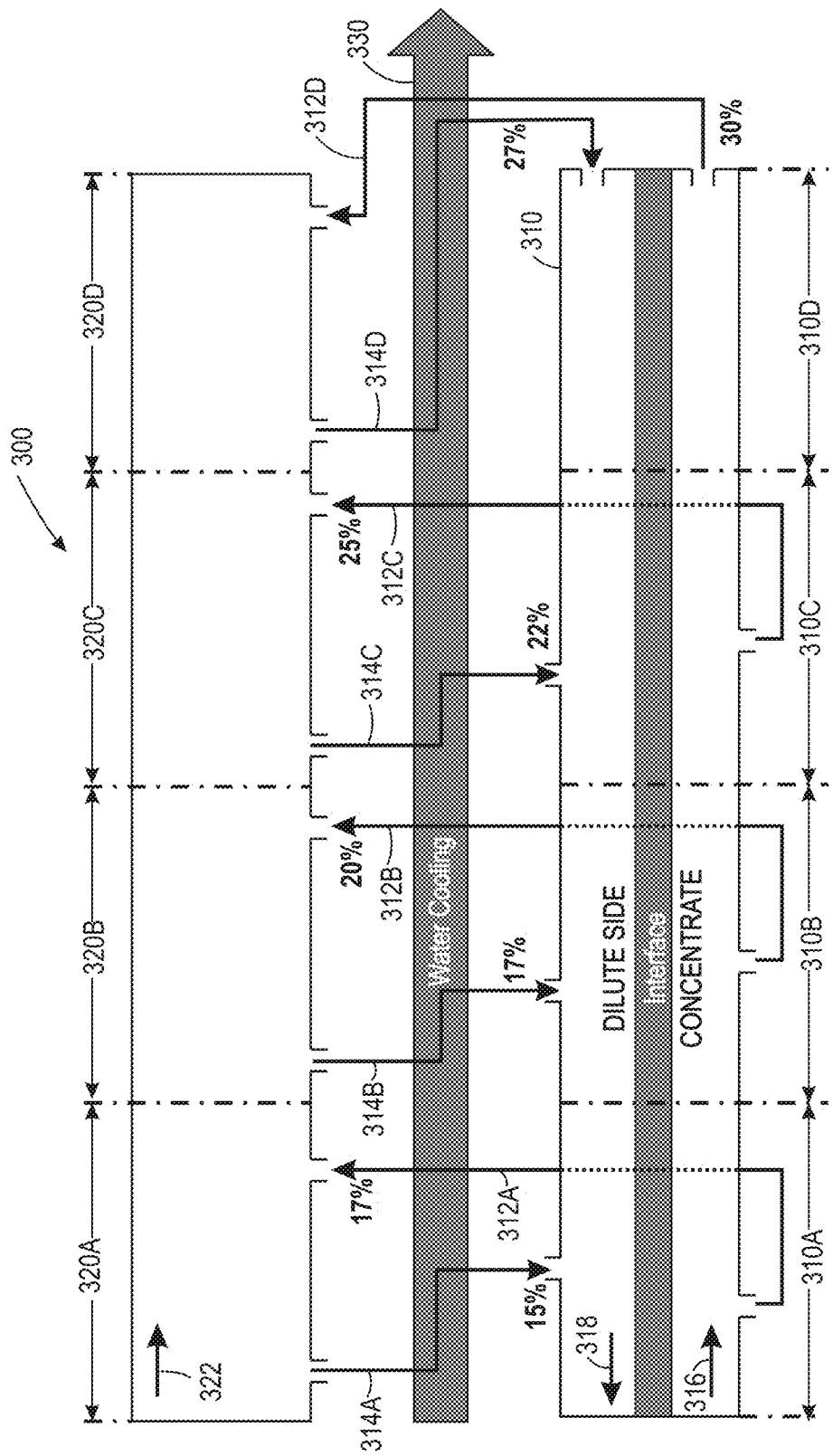
FIG. 3 is a schematic diagram of staged electrochemical liquid desiccant regeneration with staged dehumidification according to an example embodiment.

FIG. 3 illustrates a system 300 including a staged regenerator 310 coupled with a staged air contactor 320. While the staged regenerator 310 is described as an electrochemical regenerator, the stages may be similarly utilized in a reverse osmosis driven regenerator or in a thermal regeneration system. Each stage of the regenerator 310A-D outputs a concentrated stream of liquid desiccant 312A-D and each stage of the air contactor 320A-D returns a diluted stream of liquid desiccant 314A-D. The stages of both the regenerator 310A-D and air contactor 320A-D are demarcated by dashed lines. Although the stages are shown as being aligned with each other, this is not required, and the respective stages within a component (i.e., regenerator, air contactor) may have varying sizes. As can be seen, the concentrated streams 312A-D are output from the concentrated liquid desiccant chamber of the regenerator 310, and the diluted streams 314A-D are returned to the diluted desiccant chamber which is separated from the concentrated desiccant by an interface, or membrane.

An overview of an example embodiment of the stages A-D may be understood from FIG. 3. However, the concentrations used herein are merely exemplary and embodiments of the described systems may be designed using any range of concentrations where at least one of the staged concentrated outputs is less than the highest concentration for the designed air delivery conditions. Using FIG. 3, the highest concentration for the designed delivery conditions is 30% salt concentration, as shown in concentrated output stream 312D. Thus, a first stage of the regenerator 310A outputs a first concentrated liquid desiccant stream having a lower concentration of 17% to a first air contactor stage 320A. The first air contactor stage 320A returns a first diluted output stream 314A having a concentration of 15% to the first stage of the regenerator 310A. A subsequent stage outputs a second concentrated liquid desiccant stream 312B having a concentration higher than that of output stream 312A, e.g., 20%, to a subsequent air contactor stage 320B. The air contactor stage 320B returns a second diluted output stream 314B having a concentration of 17%, which is higher than that of output stream 314A, to the subsequent stage of the regenerator 310B.

A third stage outputs a third concentrated liquid desiccant stream 312C having a concentration higher than that of output stream 312B, e.g., 25%, to a third air contactor stage 320C. The air contactor stage 320C returns a third diluted output stream 314C having a concentration of 22%, which is higher than that of output stream 314B, to the third stage of the regenerator 310C. Next, a fourth, and here final, stage outputs a fourth concentrated liquid desiccant stream 312D having a concentration higher than that of output stream 312C, e.g. 30%, to a fourth air contactor stage 320D. The air contactor stage 320D returns a final diluted output stream 314D having a concentration of 27%, which is higher than that of output stream 314C, to the fourth stage of the regenerator 310D. While it is shown that the diluted output streams 314A-D are returned to specific stages, or areas, of the regenerator 310, they may be recirculated, or split, to any portion of the dilute liquid desiccant chamber of the regenerator 310.

As explained above, the regenerator chambers have the concentrated liquid desiccant and diluted desiccant streams flowing in opposing directions through the regenerator 310. For example, the concentrated desiccant flows in the direction of arrow 316 toward increasing concentrations, and the diluted solution flows in the direction of arrow 318 toward increasingly diluted concentrations. Thus, the regenerator 310 provides desiccant at lower concentrations than the final output concentration at incremental stages along flow path of the concentrating desiccant. While FIG. 3 illustrates four stages, the systems described herein can have any number of stages that utilize at least two concentrated desiccant output streams of differing concentrations.

The dehumidifying air contactor is also shown in stages 320A-D. Input air may flow along the stages of the air contactor in the direction of arrow 322 to increasingly expose the air stream to higher concentrations of liquid desiccant and increasingly remove water from the air stream. In alternative embodiments, air may be introduced at different stages of the air contactor to provide varying levels of dehumidification. In certain embodiments, the air streams exposed to the different air contactor stages 320A-D are combined to output an air stream at designed delivery conditions.

The staged system also allows for improved latent heat removal. The staged concentration liquid desiccant output streams 312A-D provide an opportunity to remove heat at multiple input locations to the air contactor 320, which further reduces energy required for latent heat removal. The heat removal system represented by arrow 330 utilizes cooling fluid, such as water, that cools the liquid desiccant at two or more inputs to the air contactor 320. The heat removal system may utilize direct or indirect heat removal such as one or more of evaporative cooling, dry cooling, and vapor compression. In alternative embodiments, the heat removal system 330 may be integrated into the air contactor 320, for example, at one or more stages in addition, or as an alternative to, an external cooling system.

Figure 4:
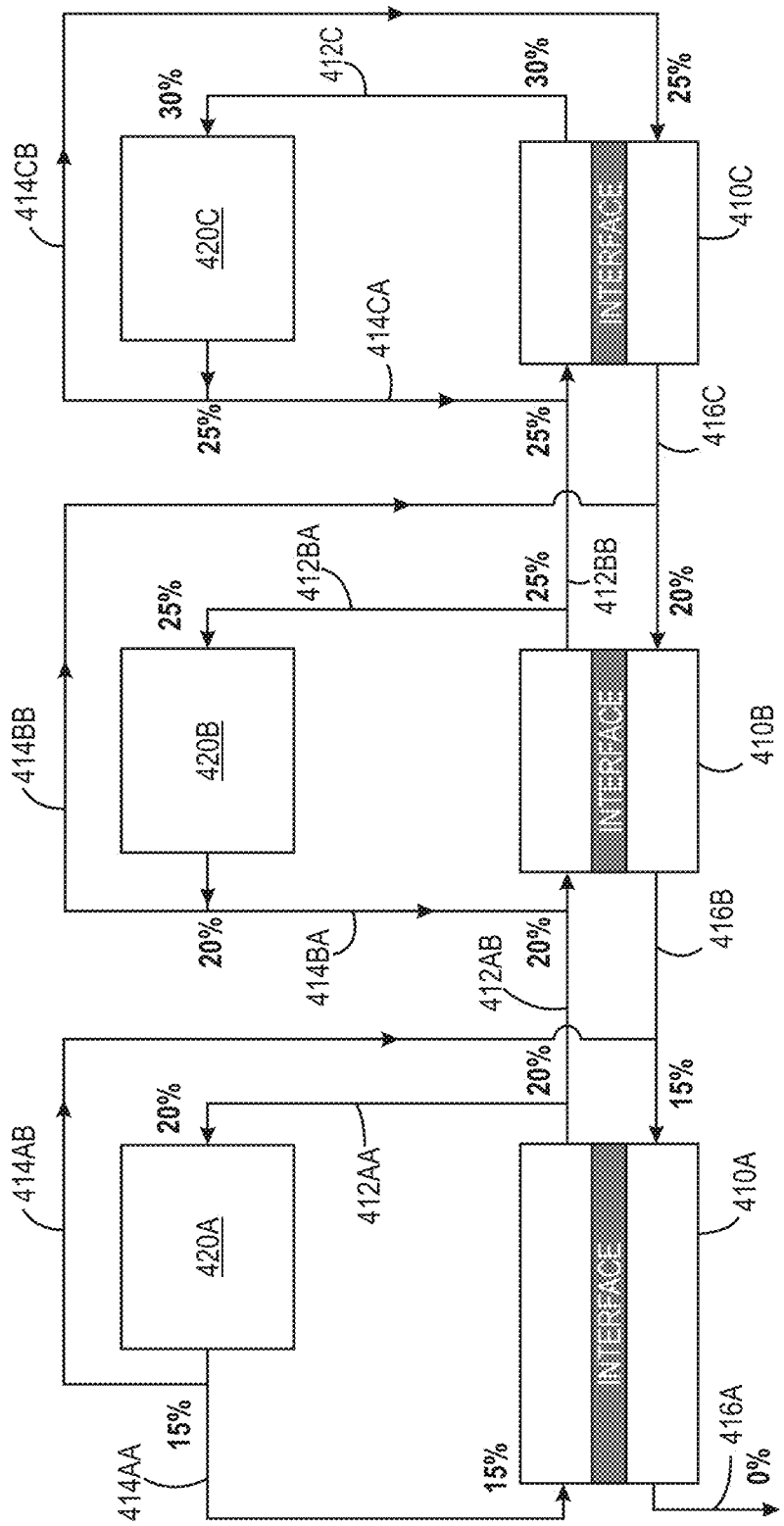
FIG. 4 is a schematic diagram of the flows between an air contactor and a regeneration system as shown in FIG. 4 according to an example embodiment.

The flows of the various concentrate and diluted liquid desiccant streams are shown in more detail in FIG. 4. In this embodiment three stages are shown, but as set forth above any number of stages may be utilized and the concentrations are merely provided as examples. As above, a first regenerator stage 410A outputs a concentrated liquid desiccant stream having a concentration of 20% where a first portion of the stream 412AA is input to a first air contactor stage 420A and a second portion of the stream 412AB is input for further concentration to a second regenerator stage 410B. The first air contactor stage 420A outputs a diluted liquid desiccant stream having a concentration of 15% where a portion of the stream 414AA is recirculated to the concentrated feed of the first regenerator stage 410A to be further concentrated and a second portion of the stream 414AB is recirculated to the diluted feed of the first regenerator stage 410A.

The second regenerator stage 410B outputs a concentrated liquid desiccant stream having a concentration of 25%, or higher than the output concentrated stream of the first stage, where a first portion of the stream 412BA is input to a second air contactor stage 420B and a second portion of the stream 412BB is input for further concentration to a subsequent, or third, regenerator stage 410C. The second air contactor stage 420B outputs a diluted liquid desiccant stream having a concentration of 20% where a portion of the stream 414BA is recirculated to the concentrated feed of the second regenerator stage 410B to be further concentrated and a second portion of the stream 414BB is recirculated to the diluted feed of the second regenerator stage 410B. The second regenerator stage 410B also outputs a diluted stream 416B having a concentration of 15% to the first regenerator stage 410A for further dilution. While the output concentration of the second air contactor stage 414BA, BB is shown as the same concentration as the input stream 412AB concentration to the second regenerator stage 410B, this is not required; they may be different.

The third regenerator stage 410C outputs a concentrated liquid desiccant stream having a concentration of 30%, or higher than the output concentrated stream of the second stage and if the final stage of the system, substantially equal to the highest concentration required for the designed delivery conditions. The stream 412C is input to a third air contactor stage 420C. The third air contactor stage 420C outputs a diluted liquid desiccant stream having a concentration of 25% where a portion of the stream 414CA is recirculated to the concentrated feed of the third regenerator stage 410C to be further concentrated and a second portion of the stream 414CB is recirculated to the diluted feed of the third regenerator stage 410C. The third regenerator stage 410C also outputs a diluted stream 416C having a concentration of 20% to the second regenerator stage 410B for further dilution. Again, the output concentration of the second air contactor stage 414BA, BB is not necessarily the same concentration as the input stream 412AB concentration to the second regenerator stage 410B.

The first contactor stage 410A is shown as outputting a diluted stream 416A having a zero (or substantially zero) percent concentration of liquid desiccant, which may be expelled from the system. However, in certain embodiments, diluted stream 416A may have a higher concentration of liquid desiccant, though less than the concentration of the diluted streams 414AA, 414AB, and 416B input to the first stage 410A, and this stream may be further regenerated (i.e., concentrated) by inputting 416A to a second, different air contactor, which is a humidifying air contactor. Similar to the air contactor stages 420A-C, the second air contactor may be a liquid to air mass and energy exchanger, including a membrane energy exchanger.

At the second air contactor, air is flowed over stream 416A, either directly or via a membrane, where water from stream 416A is absorbed by the air stream. The air stream may be outside, ambient air from the environment, or exhaust air. The resulting humidified air is output from the second air contactor as an output, humidified air stream that is returned to the environment external to the components of the dehumidification system. The resulting concentrated liquid desiccant stream is then recirculated to one or more of the regenerator stages 410A-C for further use in the regeneration process. The second air contactor liquid desiccant output stream has a concentration of liquid desiccant higher than that of stream 416A, and in certain embodiments, the second air contactor output stream has a concentration in a range of about 2-35%.

The various flows shown in FIG. 4 may occur simultaneously, or the timing of various stages of the system may also be individually controlled. For example, one or more regenerator stages 410A-C and/or one or more air contactor stages 420A-C may be operated simultaneously, or in various combinations. The system may include storage containers, with or without bypass valves, at various positions throughout the system to store/contain diluted and/or regenerated solutions of liquid desiccant to take advantage of energy savings (e.g., to operate energy intensive portions of the system during off-peak or less expensive times).

Figure 5:
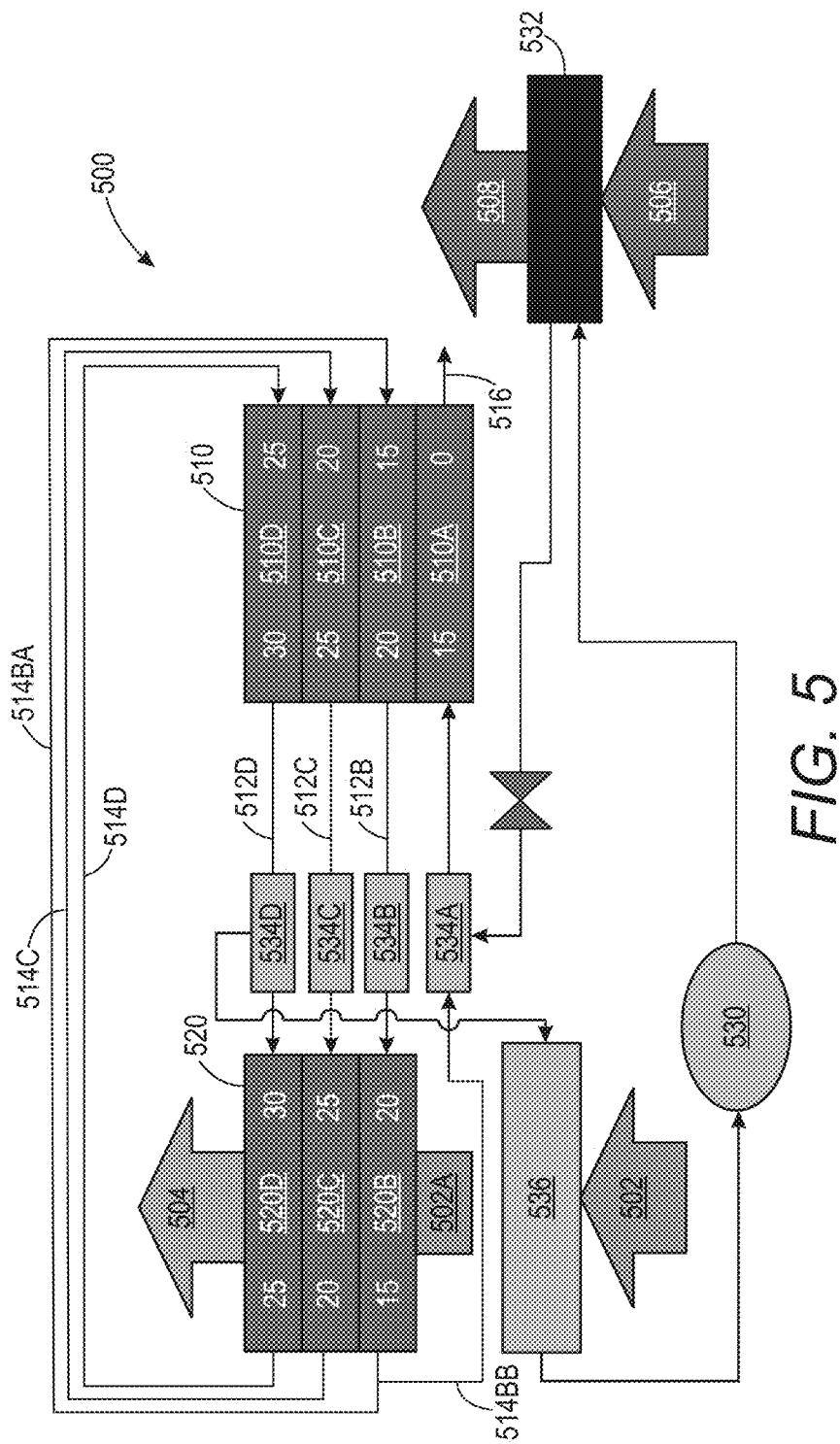
FIG. 5 is a block diagram of thermal control of a staged electrochemical liquid desiccant regenerator coupled with a staged air contactor according to an example embodiment.

FIG. 5 illustrates an example system with a staged liquid desiccant regenerator 510 coupled with a staged air contactor 520 along with sensible and latent heat removal. As discussed above, the regenerator stages 510B-D couple with respective air contactor stages 520B-D to provide liquid desiccant streams of different concentrations. For example, regenerator stage 510D outputs a stream 512D having a concentration of 30% to air contactor stage 520D, which outputs a diluted stream 514D having a salt concentration of 25%, which is recirculated to an input of at least one stage of the regenerator 510, e.g., stage 510D. Regenerator stage 510C outputs a stream 512C having a concentration of 25% to air contactor stage 520C, which outputs a diluted stream 514C having a salt concentration of 20%, which is recirculated to an input of at least one stage of the regenerator 510, e.g., stage 510C.

Regenerator stage 510B outputs a stream 512B having a concentration of 20% to air contactor stage 520B, which outputs a diluted stream having a salt concentration of 15%, which is recirculated to an input of at least one stage of the regenerator 510. In the embodiment shown, the diluted output stream is split into a first stream 514BA that is recirculated as input to regenerator stage 510B and into a second stream 514BB that is recirculated as input to regenerator stage 510A. Similarly, outputs from any of the air contactor stages 520B-D can be input to the regenerator 510 at any one stage, or split amongst two or more stages 510A-D. The air contactor 520 is staged to precisely control the liquid desiccant concentrations at each stage.

In certain embodiments, the regenerator and the air contactor do not have an equal number of stages. For example, some of the stages are coupled to the air contactor (e.g., stages 510B-D) and some of the stages internally regenerate the liquid desiccant (e.g., stage 510A). In further embodiments, one or more regenerator stages may be coupled to a second, humidifying air contactor as described above. For example, output stream 516 may couple to another air contactor or alternatively be used as a drain for the system.

Liquid desiccant within air contactor 520 will also heat up as moisture is transferred from the air to the liquid desiccant. As the liquid desiccant and air increase in temperature, the capability of the liquid desiccant to absorb moisture from air is diminished. Thus, maintaining a lower temperature in the air contactor improves operability and efficiency of the air contactor. This can be achieved in several ways including pre-cooling the air entering the air contactor, pre-cooling the liquid desiccant, and/or introducing a third cooling fluid inside the air contactor.

The embodiment of FIG. 5 shows the evaporative side of a vapor compression system in thermal contact with each stage of liquid desiccant before entering air contactor 520, which reduces, or minimizes, the complication of the air contactor 520 design while providing staged cooling. While the staged cooling is illustrated as a vapor compression system, cooling may be accomplished through alternative methods such as with chilled water or indirect evaporative cooling. As shown, each concentration feed of desiccant may be separately cooled to control the input temperature of each concentration of desiccant at each stage of the air contactor 520. For example, input desiccant 512B is cooled at 534B, input desiccant 512C is cooled at 534C, and input desiccant 512D is cooled at 534D. In alternative embodiments, one or more cooling stations may cool one or more of the input desiccant streams 512B-D. Cooling station 534A also cools the liquid desiccant stream 514BB that is recirculated to the regenerator 510.

In addition to pre-cooling the liquid desiccant, FIG. 5 shows an embodiment where the incoming air 502 to the air contactor 520 is also pre-cooled. The incoming air 502 is exposed to an evaporator 536, which is coupled to the cooling stations 534A-D. After removal of sensible heat by exposure to the evaporator 536, the cooled incoming air 502A is exposed to one or more stages 520B-D of the air contactor 520 and leaves as conditioned air stream 504. The conditioned air stream 504 is then provided to the intended enclosed space (e.g., building).

Cooling fluid (e.g., gas or liquid) leaves the evaporator 536 to enter a vapor compressor 530 where the temperature of the cooling fluid is increased. The fluid is then provided to a condenser 532 that receives outside or vent/exhaust air 506 to expel heated outside air 508. The condenser 532 may be another air contactor as described above. The cooling fluid is then coupled to the liquid desiccant cooling stations 534A-D, where such coupling includes an expansion valve. In certain embodiments, the vapor compression system may be used in connection with internal cooling, e.g., added cooled fluid flows, in one or more stages of the air contactor 520.

Figure 6A:
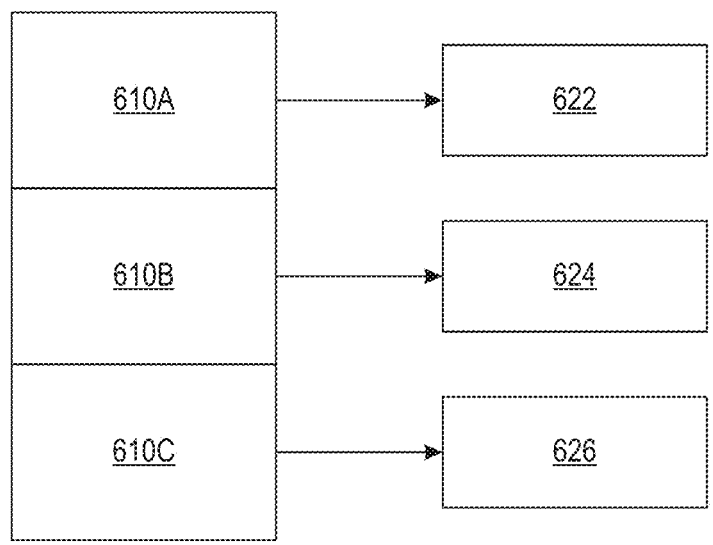
FIGS. 6A-D are block diagrams of staged regenerated liquid desiccant dehumidification systems according to various example embodiments.
Figure 6B:
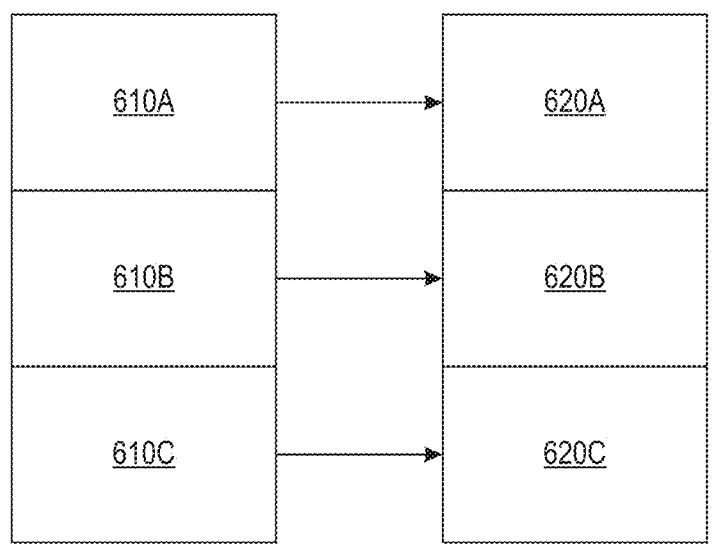
Figure 6C:
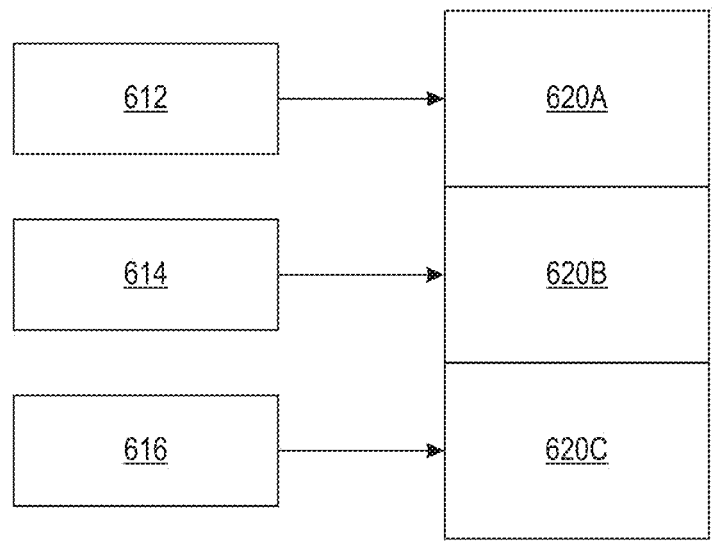
Figure 6D:
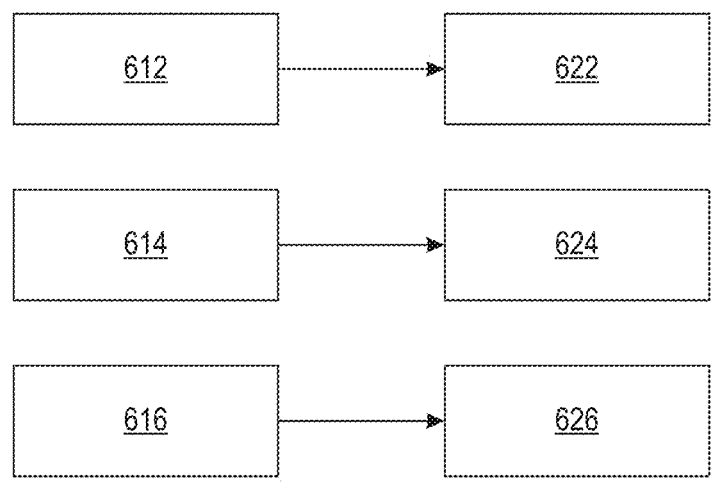

FIGS. 6A-D illustrate various configurations of the staged regenerator and staged air contactor systems described above. FIG. 6A illustrates a single regenerator having stages 610A-C coupled with multiple air contactors 622, 624, 626. For example, regenerator stages 610A-C may be included in a single housing, while one or more of air contactors 622, 624, 626 have discrete housings. FIG. 6B illustrates a single regenerator having stages 610A-C coupled with a single air contactor having multiple stages 620A-C. As set forth above, regenerator stages 610A-C may be included in a single housing and air contactor stages 620A-C may be included in a single housing. FIG. 6C illustrates multiple regenerators 612, 614, 616 coupled to a single air contactor having multiple stages 620A-C. For example, one or more of regenerators 612, 614, 616 may have discrete housings, while air contactor stages 620A-C may be included in a single housing. FIG. 6D illustrates multiple regenerators 612, 614, 616 coupled to multiple air contactors 622, 624, 626. For example, one or more of regenerators 612, 614, 616 have discrete housings, and one or more of air contactors 622, 624, 626 have discrete housings. In addition, any combination of stages may be included in a single housing, for example, two stages of a regenerator or air contactor may share a housing while a third stage may have a separate housing. Thus, embodiments described herein may include a single staged regenerator, a single staged air contactor, multiple regenerators, multiple air contactors, and any combination thereof. While each of the above examples shows regenerator stages/regenerators coupled with an equal number of air contactor stages/air contactors, systems described herein may have unequal numbers of regenerator stages/devices and air contactor stages/devices. The sizes of each stage, or device, likewise are not required to be identical to each other.

Figure 7:
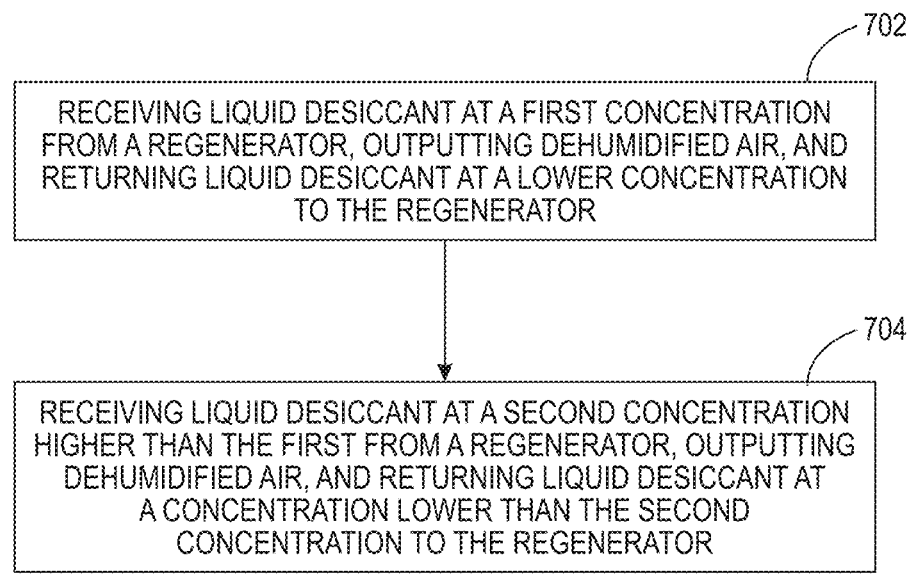
FIG. 7 is a flow chart of a method according to an example embodiment.

While embodiments described herein can involve a variety of configurations, staged liquid desiccant regeneration and dehumidification involves utilizing at least two concentrated liquid desiccant streams having different salt concentrations to dehumidify air using at least one salt concentration that is lower than a concentration required for an otherwise identical non-staged dehumidification system using a single salt concentration as set forth in FIG. 7. In certain embodiments liquid desiccant at a first concentration is received from a regenerator by an air contactor. The air contactor outputs air having a water content by percent mass that is lower than that of an incoming air stream to the air contactor and outputs a diluted liquid desiccant stream having a concentration lower than the input stream to the regenerator 702. This may be performed by a first stage of the air contactor. Liquid desiccant at a second concentration, higher than the first concentration is also received by the air contactor. The air contactor outputs air having a water content by percent mass that is lower than that of an incoming air stream to the air contactor and outputs a diluted liquid desiccant stream having a concentration lower than the second concentration to the regenerator 704. This may be performed by a second stage of the air contactor. For example, the air output from the second stage has a water content lower than water content of the air output from the first stage of the air contactor. In certain embodiments, the regenerator is a staged electrochemical liquid desiccant regenerator.

The systems described herein with respect to various embodiments involve a liquid desiccant regeneration system having staged outputs of at least two different desiccant concentrations in combination with a staged air contactor. These systems reduce energy consumption, particularly in electrochemically regenerated dehumidification and air conditioning systems, reduce system costs, increase the options for system operating ranges, and can reduce or eliminate the loss of desiccant materials in the system. They provide increased efficiency and environmentally responsible options for meeting the expected, increased need for dehumidification and air conditioning systems.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range. Also, all uses of "%" with respect to concentrations in the application refer to weight percent (wt. %) unless otherwise indicated.

The foregoing description has been presented for the purposes of illustration and description. It is not intended to be exhaustive or to limit the embodiments to the precise form disclosed. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A system, comprising:
   a liquid desiccant regenerator including a first stage configured to generate a first concentrated output stream having a first concentration of liquid desiccant, and a second stage configured to generate a second concentrated output stream having a second concentration of liquid desiccant different than the first concentration;
   a first air contactor stage configured to be coupled to the first concentrated output stream to dispose a first input air stream having a first water content by percent mass in fluid communication with the first concentrated output stream to form a first output air stream having a second water content by percent mass lower than the first water content and a first diluted air contactor output stream, wherein the first diluted air contactor output stream is circulated back into the liquid desiccant regenerator; and
   a second air contactor stage coupled to the second concentrated output stream to dispose disposing a second input air stream having a third water content by percent mass in fluid communication with the second concentrated output stream to form a second output air stream having a fourth water content by percent mass lower than the third water content and a second diluted air contactor output stream, wherein the second diluted air contactor output stream is circulated back into the liquid desiccant regenerator and the first and second output air streams are combined.

2. The system of claim 1, wherein the liquid desiccant regenerator is an electrochemical regenerator configured to be driven by an electric potential.

3. The system of claim 1, wherein the liquid desiccant regenerator is an electrochemical regenerator configured to be driven by an electric potential that engenders faradaic reactions happening at two different electrodes and material undergoing the faradaic reactions is circulated from one electrode to the other and back again.

4. The system of claim 1, wherein the liquid desiccant regenerator is configured to be driven by reverse osmosis.

5. The system of claim 1, wherein the liquid desiccant regenerator is a thermal regenerator.

6. The system of claim 1, wherein the third water content by percent mass is different from the first water content by percent mass.

7. The system of claim 1, wherein the first air contactor stage and the second air contactor stage are separate air contactors.

8. The system of claim 1, wherein the first air contactor stage and the second air contactor stage are stages of the same air contactor.

9. The system of claim 1, further comprising a heat remover fluidly coupled to at least one of the first air contactor stage or the second air contactor stage to remove heat from at least one of the first input air stream or the second input air stream.

10. The system of claim 9, wherein the heat remover includes a first stage configured to be coupled to the first regenerated output stream and a second stage configured to be coupled to the second regenerated output stream.

11. The system of claim 9, wherein the heat remover is configured to utilize at least one of evaporative cooling or dry cooling.

12. The system of claim 9, wherein the heat remover is configured to utilize vapor compression.

13. The system of claim 9, wherein the heat remover is configured to be coupled to the at least two streams within at least one of the first and second air contactor stages.

14. The system of claim 1, wherein the liquid desiccant regenerator includes a third stage coupled to at least one of the first stage or second stage.

15. The system of claim 1, wherein at least one of the first or second diluted output streams is configured to be fluidically coupled to a third air contactor stage that is configured to produce a concentrated air contactor output stream having an increased salt concentration as compared to at least one of the first and second diluted output streams and to increase the water content by mass of a third input air stream, wherein the concentrated air contactor output stream is circulated back into the liquid desiccant regenerator.

16. An air contactor, comprising:
   a first input stream of liquid desiccant having a first concentration of desiccant;
   a second input stream of liquid desiccant having a second concentration of desiccant where the second concentration is higher than the first concentration; and
   an input air stream disposed in fluid communication with the first input stream of liquid desiccant and with the second input stream of liquid desiccant to produce a diluted output stream of liquid desiccant and an output air stream having a water content by mass lower than that of the input air stream.

17. The air contactor of claim 16, wherein the input air stream is exposed to at least one of the first and second input streams of liquid desiccant through an intervening interface.

18. The air contactor of claim 16, wherein the diluted output stream is coupled to a liquid desiccant regeneration system configured to provide the first and second input streams of liquid desiccant.

19. The air contactor of claim 16, further comprising a heat remover configured to be coupled to the first and second input streams.

20. A system, comprising:
   a first liquid desiccant regenerator configured to produce a first concentrated output stream having a first concentration of liquid desiccant;
   a second liquid desiccant regenerator configured to be coupled to the first concentrated output stream and configured to produce a second concentrated output stream having a second concentration of liquid desiccant different than the first concentration;
   a first air contactor stage configured to be coupled to the first concentrated output stream to dispose a first input air stream having a first water content by mass in fluid communication with the first concentrated output stream to form a first output air stream having a second water content by mass lower than the first water content and a first diluted output stream, wherein the first diluted output stream is circulated back into the first liquid desiccant regeneration system; and
   a second air contactor stage configured to be coupled to the second concentrated output stream to dispose a second input air stream having a third water content by mass in fluid communication with the second concentrated output stream to form a second output air stream having a fourth water content by mass lower than the third water content and a second diluted output stream, wherein the second diluted output stream is circulated back into the second liquid desiccant regenerator and the first and second output air streams are combined.

21. The system of claim 20, wherein the first air contactor stage and the second air contactor stage are separate air contactors.

22. The system of claim 20, wherein the first air contactor stage and the second air contactor stage are stages of the same air contactor.

* * * * *